Dec. 29, 1964     S. P. ANDERSON ETAL     3,163,691
PROCESS AND APPARATUS FOR THREE LAYER NET EXTRUSION
Filed Nov. 25, 1960                 4 Sheets-Sheet 4
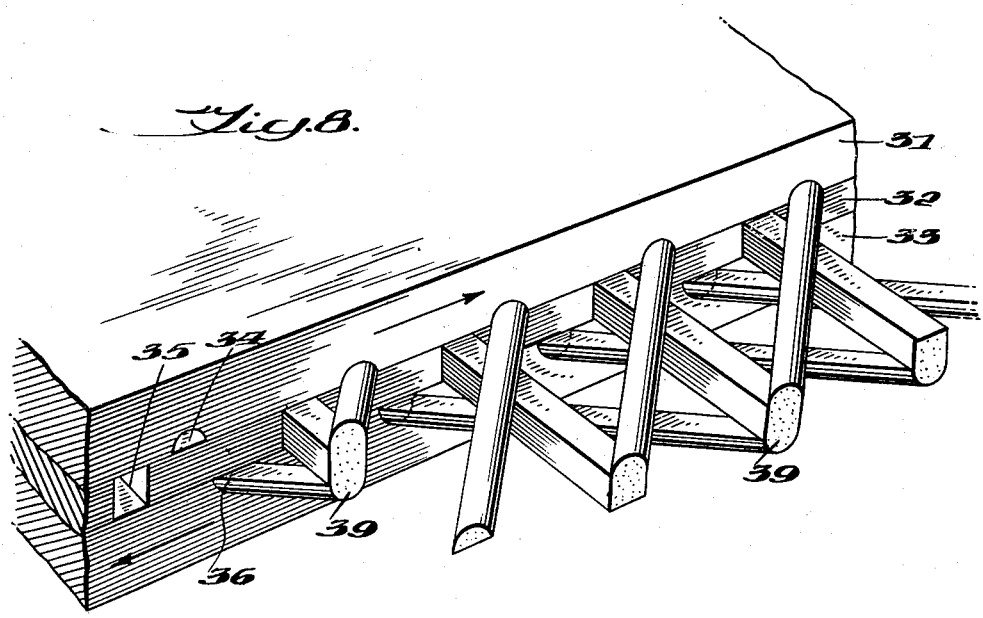
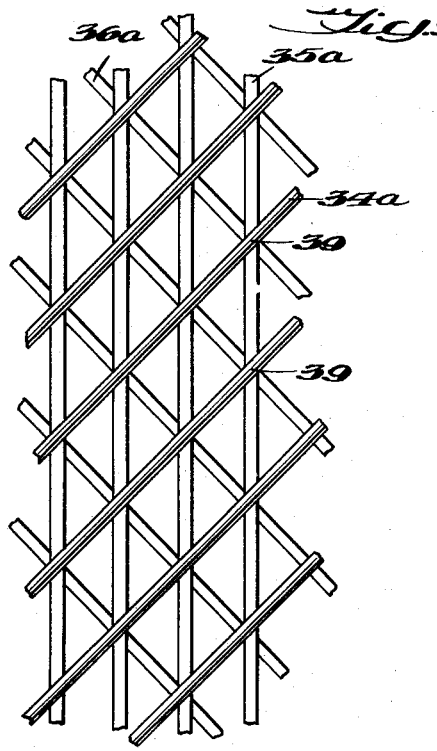
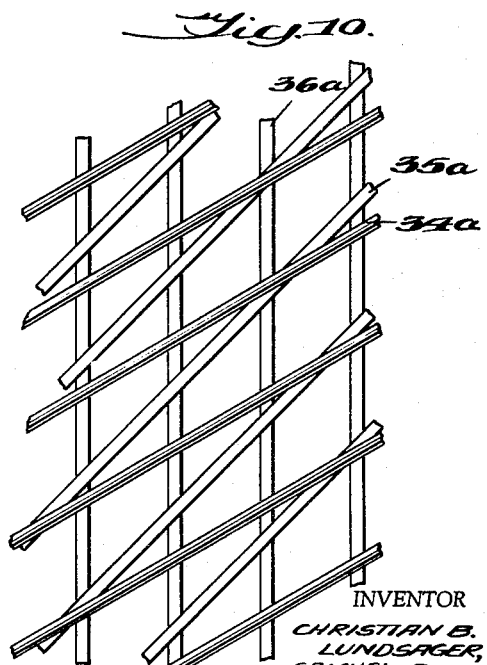

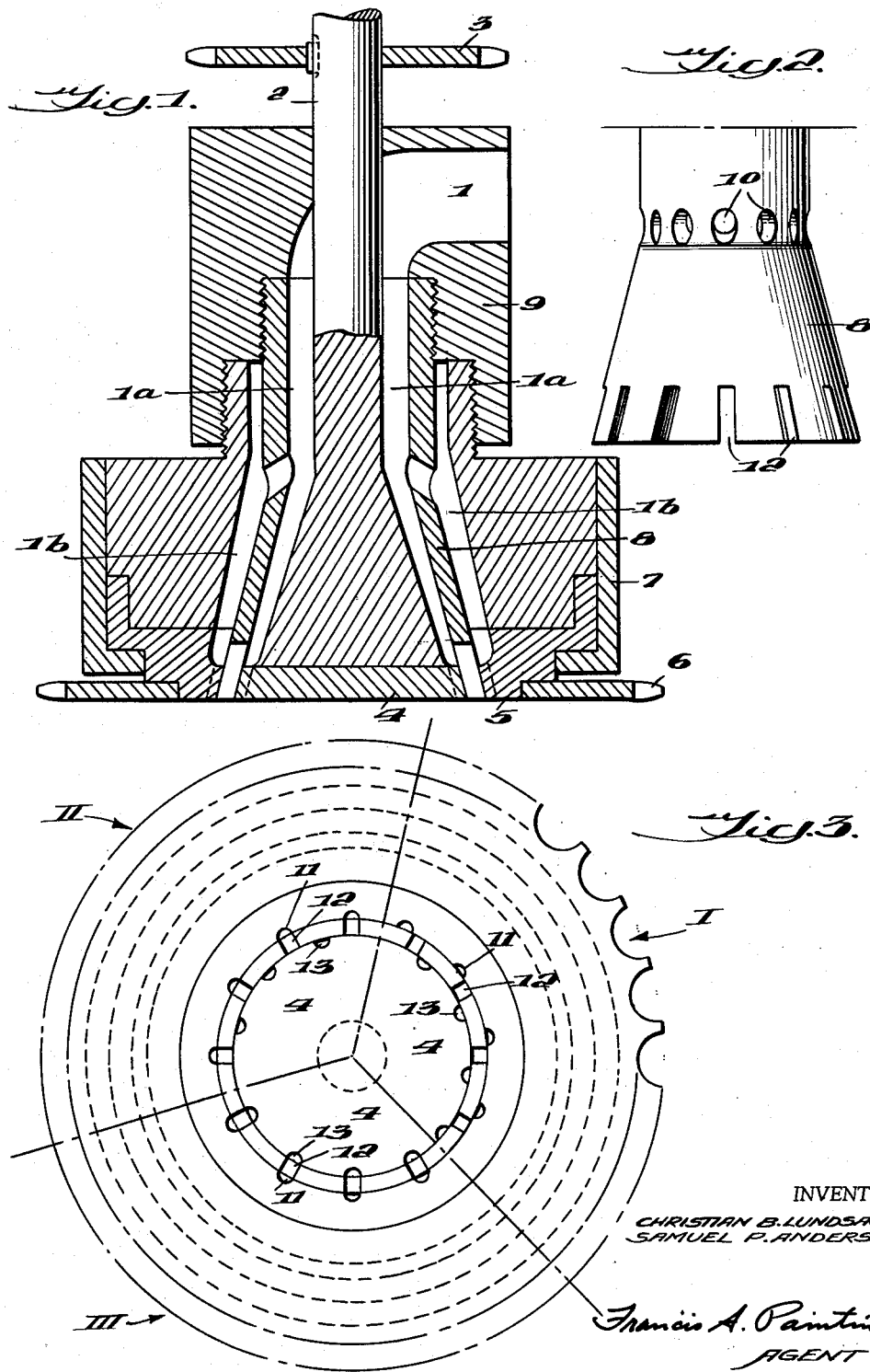

United States Patent Office 3,163,691
Patented Dec. 29, 1964

3,163,691
PROCESS AND APPARATUS FOR THREE LAYER NET EXTRUSION
Samuel P. Anderson, Wilmington, Del., and Christian B. Lundsager, Buffalo, N.Y., assignors to E. I. du Pont de Nemours and Company, Wilmington, Del., a corporation of Delaware
Filed Nov. 25, 1960, Ser. No. 71,506
10 Claims. (Cl. 264—167)

This invention relates to reinforced plastic netting, and to a process and apparatus for making it continuously.

Plastic net bags are being introduced to the trade for packaging various articles such as produce and candy bars. A process and apparatus for making tubular plastic netting suitable for preparing such bags are disclosed in Mercer, U.S. Patent 2,919,467. For reasons of economy and appearance, it is desirable in many cases to use netting which, however, has not been sufficiently stable to retain bag-like dimensions during and after filling. For example, the filling of plastic net bags of diamond-shaped mesh is complicated by the tendency of the bags to elongate under the weight of the contents. This is particularly troublesome in the filling of bags with onions, oranges or potatoes. The resulting package often is in the shape of a long tube rather than that of a conventional bag of somewhat rectangular shape.

It is an object of this invention to provide reinforced plastic netting. It is a further object to provide tubular plastic netting reinforced in the longitudinal direction. A still further object is to provide a process and apparatus for the continuous extrusion of such netting. Yet another object is to provide such netting having integrally extruded joints between net strands. Other objects will appear hereinafter.

These and other objects are accomplished by the instant invention which comprises a method of manufacturing an integral plastic net-like structure composed of three layers of parallel strands and integral intersections thereof which comprises extruding streams of plastic to form said layers of strands from three adjacent die-carrying members each having a set of extrusion orifices cooperative with those of each adjacent member, forming integrally extruded unitary intersections between the first and second layers and between the second and third layers of strands by uniting adjacent streams as they are extruded into unitary intersection-forming streams, continuing the extrusion while dividing each intersection-forming stream to form separate strand-forming streams and reuniting said adjacent streams into further unitary intersection-forming streams.

This invention further comprises an apparatus for the extrusion of plastic net comprising three adjacent die-carrying members A, B and C wherein member B is situated intermediate members A and C, the latter members having surfaces in contacting relationship with surfaces of member B, each of members A and C having a set of strand-extruding dies which open on said surfaces at the extrusion end of said dies, member B having a set of strand-extruding dies, each die extending transversely across the extrusion end of said member B and opening onto both its surfaces at the extrusion end, and means for moving two of said members transverse to the direction of extrusion such that the dies of members A and C and the dies of member B repeatedly pass in registration.

This invention also comprises a plastic net-like structure consisting of three crossing layers, each of which is a plurality of parallel homogeneous strands which continuously extend and form intersections with the strands of each adjacent layer periodically for the length of said structure, the strands of adjacent layers being divisions of the plastic masses which form the intersections of the strands.

Preferably, the method and apparatus of this invention produce a tubular net having the strands of one of its layers of strands being parallel to the axis of the tubular net itself. In all cases the method and apparatus will produce a net having integrally extruded intersections between adjacent layers. By this is meant integral intersections between the first layer and the second layer and integral intersections between the second layer and the third layer. Only in the most preferred embodiment, however, will the method and apparatus form nets having intersections of all three layers at the same points; the apparatus to produce such netting requires synchronization means to accurately time the movement of the die-carrying members. Such means are known to those skilled in the art.

The plastic netting of this invention is preferably produced by the method and apparatus of this invention but could be produced by other means wherein the intersections would not necesarily be integrally extruded.

The term "register" or "registration" as used herein and in the claims means the juxtapositioning of the die orifices of the respective sets in their displacement as to coincide or come exactly opposite to one another or into partially over-lapping portions, so that each registering pair of die orifices forms a single composite orifice common to both sets of dies, through which each integral intersection is extruded.

By the term "plastic" (as used herein and in the claims) is meant:

(a) A synthetic thermoplastic capable of melt or compression extrusion in a molten state through dies and settable by a cooling medium on issuance from the dies. Suitable thermoplastic materials include polyamides or superpolyamides, such as nylon; polyesters; polyvinyl-chloride and copolymers thereof with vinylacetate or vinylidene chloride; polyethylene and the like and cellulose acetate; or (b) Natural or synthetic rubbers, subsequently vulcanized or containing vulcanizing agents; or (c) Those thermosetting plastic materials or mixtures thereof with thermoplastic materials, which are capable of extrusion; or (d) Wet spinnable materials, such as viscose, cuprammonium cellulose or protein material (e.g., from soya bean), capable of extrusion and setting by immersion in or spraying with a coagulant as the plastic emerges from the dies.

The invention will now be described with reference to the attached drawings wherein:

FIG. 1 is a sectional elevation of one form of extrusion apparatus according to this invention in which two coaxial annular die-carrying members are employed with means for movement and the intermediate die-carrying member is stationary.

FIG. 2 is a partial elevation view of the intermediate die-carrying member of FIG. 1.

FIG. 3 is a plan view of the three coaxial die-carrying members in three parts showing the strand-extruding dies in three possible positions.

FIGS. 6 and 8 are perspective diagrams illustrating the principles of extrusion of three-layer netting according to this invention.

FIGS. 7, 9 and 10 are partial diagrams of net patterns obtainable by the process and apparatus of this invention.

Figure 4:
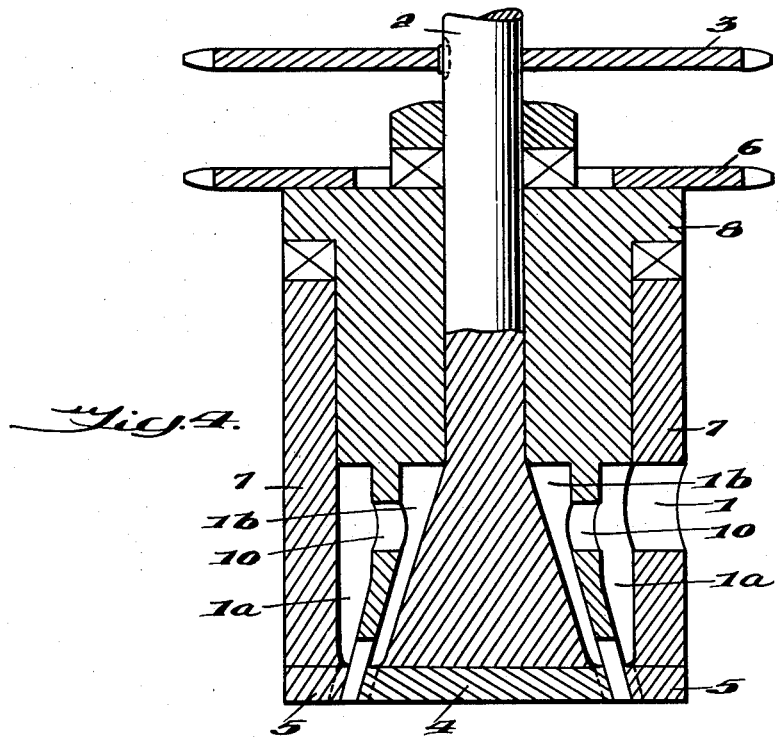
FIG. 4 is a sectional elevation of another form of extrusion apparatus similar to FIG. 1 wherein only the outer die-carrying member is stationary.

With reference to FIG. 1, a plastic material is fed into inlet 1 by suitable means and flows down into cavities 1a and 1b. Shaft 2 is equipped for rotation through sprocket 3 and contains inner die-carrying member 4 at its base. Outer die-carrying member 5 is mounted within housing 7. Intermediate die-carrying member 8 is stationary and is fixedly attached to extrusion chamber 9. It has a plurality of orifices 10 which permit flow of the plastic from cavity 1a to cavity 1b and down around all three die-carrying members. Outer die-carrying member 5 is also provided with a sprocket 6 for rotation by suitable means.

FIG. 2 illustrates inner die-carrying member 8 in detail. Slots 12 in its base are the dies which form the intermediate layer of strands. These slots extend further from the face of the dies than the die portions of members 4 and 5 to enable a plastic feed to the slots from both cavities 1a and 1b.

FIG. 3 illustrates the extrusion end of the die-carrying members 4, 5 and 8. Outer die-carrying member 5 is shown to contain a plurality of dies 11 which open onto its surface of contact with die-carrying member 8. Inner die-carrying member 4 is shown to have a plurality of dies 13 which open onto its surface of contact with die-carrying member 8. Intermediate die-carrying member 8 is shown having a plurality of slots 12 which extend radially across its surface and open onto its surfaces of contact with both die-carrying members 4 and 5.

It should be noted that FIG. 3 is divided into parts I, II and III. Part I shows the dies 11, 12 and 13 out of registration; in this position each set extrudes individual strands. In part II, dies 11 and 12 are shown in registration and, therefore, capable of extruding unitary intersections between two layers, but dies 13 are shown out of registration and, therefore, capable only of extruding individual strands. In part III, all three sets of dies 11, 12 and 13 are shown in registration and, therefore, capable of extruding unitary intersections of all three layers of strands. Synchronization is required to cause the registration shown in part III at regular intervals. The operation of the three die-carrying members illustrated in FIG. 3 is applicable to the apparatus illustrated in FIGS. 4 and 5 as well as FIG. 1.

FIG. 4 illustrates an apparatus according to this invention similar to that in FIG. 1 except that in FIG. 4 the outer die-carrying member is stationary and the inner two die-carrying members are rotatable. In this embodiment, outer die-carrying member 5 is attached to the housing 7. The intermediate die-carrying member 8 is rotatable and has sprocket 6 connected thereto. Inner die-carrying member 4 is attached to the base of the shaft 2 as it was in FIG. 1. Sprocket 3 is also attached to the shaft for the purpose of imparting rotation thereto. Intermediate die-carrying member 8 also has a plurality of orifices 10 as in FIG. 1 to permit a flow of plastic from cavity 1a to cavity 1b.

Figure 5:
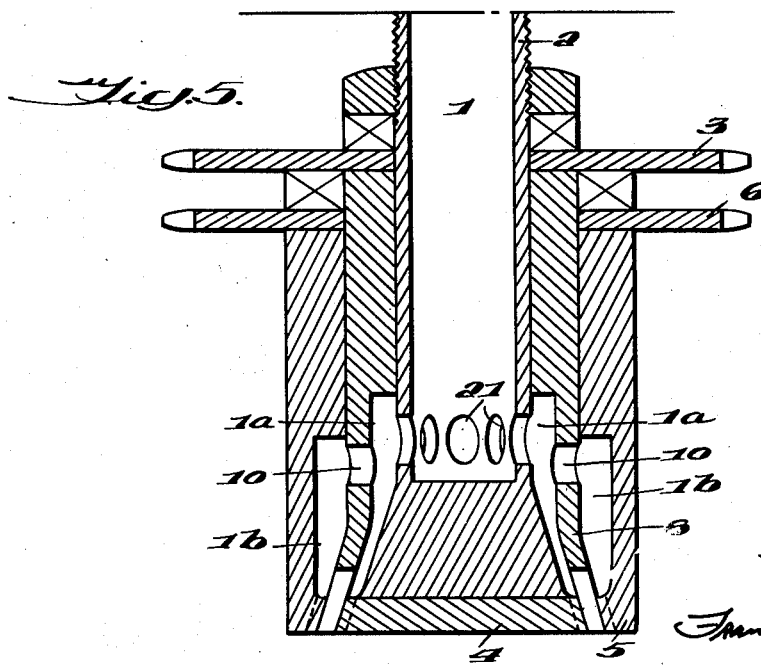
FIG. 5 is a sectional elevation of still another form of extrusion apparatus similar to FIGS. 1 and 4 wherein only the inner die-carrying member is stationary.

In FIG. 5, a further modification of the apparatus of this invention is shown wherein the inner die-carrying member 4 is held stationary while members 5 and 8 are rotatable. Another major difference is that in FIG. 5, shaft 2 is hollow containing inlet 1 and the plastic is introduced therethrough flowing out through orifices 21 into cavity 1a. Intermediate die-carrying member 8 also has a plurality of orifices 10 therein which permit the plastic to flow from cavity 1a to cavity 1b. Die-carrying members 5 and 8 are equipped with sprockets 6 and 3, respectively to impart rotation.

Figure 6:
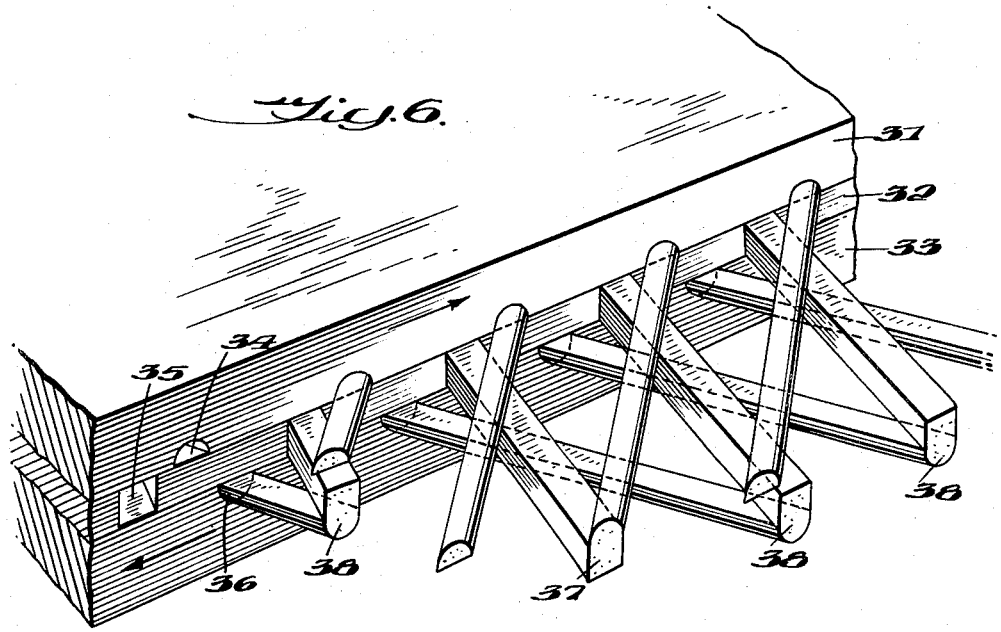
Figure 7:
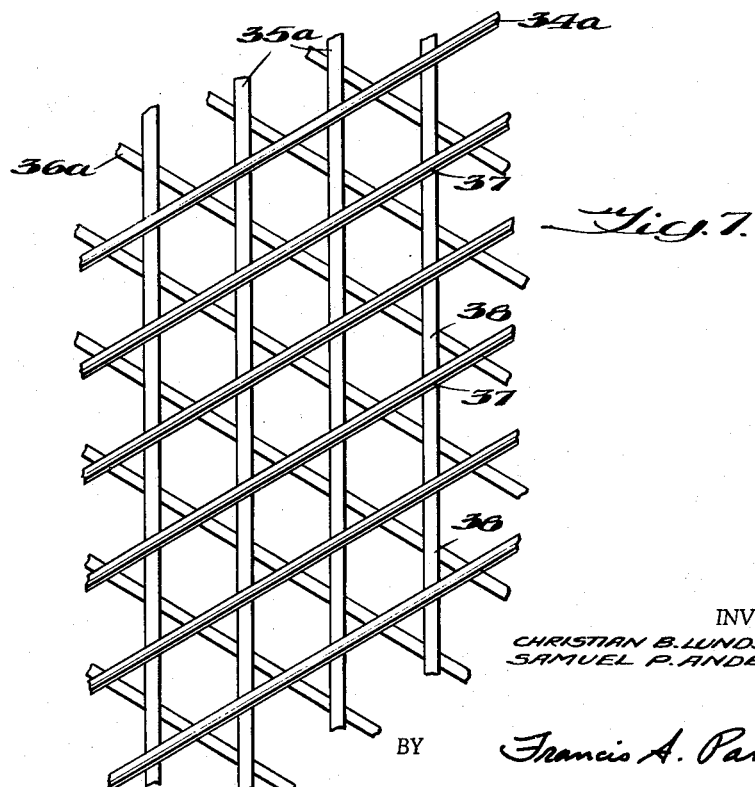

FIG. 6 illustrates a portion of the die-carrying members according to this invention which for convenience are shown in rectlinear form. Die-carrying members 31, 32 and 33 have sets of dies 34, 35 and 36 therein, respectively. Layers of strands 34a, 35a and 36a are extruded from dies 34, 35 and 36, respectively. In the case illustrated, die-carrying members 31 and 33 are moved transversely in opposite directions while intermediate die-carrying member 32 is held stationary. At the point where dies 34 and 35 are in registration during relative movement, unitary intersections 37 are produced, whereas, when dies 35 and 36 are in registration, unitary intersections 38 are produced. FIG. 7 illustrates a portion of a net produced from the dies illustrated in FIG. 6 using corresponding reference numerals.

FIG. 8 illustrates an assembly identical to that in FIG. 6. However, the relative movement of die-carrying members 31, 32 and 33 has been synchronized such that dies 34 and 36 pass dies 35 simultaneously during extrusion producing integral intersections 39 composed of all three layers of strands. This method of operation produces a net shown in FIG. 9 wherein all intersections are unitary intersections of all three layers of strands.

FIG. 10 illustrates a net produced according to the invention wherein one die-carrying member is held stationary to produce longitudinal strands 36a while the other two die-carrying members are moved in the same direction but at different rates to produce diagonal strands 34a and 35a.

In the above illustrations, the intermediate die-carrying member has been shown to be stationary. However, either of the die-carrying members could be held stationary with relative movement of the remaining two members. Thus, the invention embodies nets having the longitudinal strands lying in any one of three layers.

Although the above apparatus illustrations have been shown to be those which would produce tubular nets, this invention also embodies apparatus which would have rectilinear dies such as those shown in FIGS. 6 and 8. Suitable equipment for employing such dies is shown in FIGS. 6 through 8 of Mercer, U.S. Patent 2,919,467 which could be appropriately modified in view of the teachings herein.

The strands produced by this invention may have various cross-sectional shapes, e.g., square, oval, flat on one side, etc. This is largely a matter of choice of design and may depend upon the particular use to which the product will be put.

The nets produced according to this invention have greater dimensional stability and strength. They are particularly useful for use in plastic net bags wherein retention of shape and dimensions is important. Another advantageous use is in extruded rigid tubes of stiff netting wherein the third reinforcing layer enables better resistance to compressive radial stress.

What is claimed is:

1. A method of manufacturing an integral plastic net-like structure composed of three layers of parallel strands and integral intersections thereof which comprises extruding streams of plastic to form said layers of strands from three adjacent die-carrying members each having a set of extrusion orifices cooperative with those of each adjacent member, forming integrally extruded unitary intersections between the first and second layers and between the second and third layers of strands by uniting adjacent streams as they are extruded into unitary intersection-forming streams, continuing the extrusion while dividing each intersection-forming stream to form separate strand-forming streams and reuniting said adjacent streams into further unitary intersection-forming streams.

2. A method of manufacturing an integral tubular plastic net-like structure composed of three concentric layers of parallel strands and integral intersections thereof which comprises extruding streams of plastic to form said layers of strands from three adjacent, concentric die-carrying members each having a set of extrusion orifices cooperative with those of each adjacent member, directing one of said streams parallel to the direction of extrusion, and directing the other two stream in a helical direction, forming integrally extruded unitary intersections between the first and second layers and between the second and third layers of strands by uniting adjacent streams as they are extruded into unitary intersection-forming streams, continuing the extrusion while dividing each intersection-forming stream to form separate strand-forming streams and reuniting said adjacent streams into further unitary intersection-forming streams.

3. Method according to claim 2 wherein all three adjacent streams are united to form integrally extruded unitary intersections of the three layers, continuing the extrusion to form separate strand-forming streams and reuniting said three adjacent streams into further unitary intersection-forming streams.

4. An apparatus for the extrusion of plastic net comprising three adjacent die-carrying members A, B and C wherein member B is situated intermediate members A and C, the latter members having surfaces in contacting relationship with surfaces of member B, each of members A and C having a set of strand-extruding dies which open on said surfaces at the extrusion end of said dies, member B having a set of strand-extruding dies, each die extending transversely across the extrusion end of said member B and opening onto both its surfaces at the extrusion end, and means for moving two of said members transverse to the direction of extrusion such that the dies of members A and C and the dies of member B repeatedly pass in registration.

5. Apparatus according to claim 4 wherein said members are rectilinear and the means for moving two of said members is a means for imparting relative reciprocatory movement.

6. An apparatus for the extrusion of tubular plastic net comprising three adjacent concentric die-carrying members A, B, and C wherein member A is the innermost concentric member and wherein member B is situated intermediate members A and C, the latter members having surfaces in contacting relationship with surfaces of member B, each of members A and C having a set of strand-extruding dies in the form of open grooves which open on said surfaces at the extrusion end of said dies, member B having a set of strand-extruding dies in the form of open slots extending radially across the extrusion end of said member B and opening onto both its surfaces at the extrusion end, and means for axially rotating two of said members such that the dies of members A and C and the dies of member B repeatedly pass in registration.

7. Apparatus according to claim 6 wherein member B is stationary during extrusion and members A and C have means for contra-rotation.

8. Apparatus according to claim 6 wherein member A is stationary during extrusion and members B and C have means for contra-rotation.

9. Apparatus according to claim 6 wherein member C is stationary during extrusion and members A and B have means for contra-rotation.

10. Apparatus according to claim 6 wherein member B is stationary during extrusion and members A and C have means for contra-rotation and means for synchronization such that the dies of members A and C pass the dies of members B simultaneously with the dies of all three members in registration.

References Cited in the file of this patent
UNITED STATES PATENTS

| | | |
|---|---|---|
| 2,281,635 | Strauss | May 5, 1942 |
| 2,851,389 | Lappala | Sept. 9, 1958 |
| 2,892,212 | Rhodes | June 30, 1959 |
| 2,919,467 | Mercer | Jan. 5, 1960 |
| 3,029,174 | Schultheiss | Apr. 10, 1962 |